(12) United States Patent
Oikawa et al.

(10) Patent No.: US 12,195,911 B2
(45) Date of Patent: Jan. 14, 2025

(54) HEAT INSULATING SHEET AND METHOD OF MANUFACTURING THEREOF, AND ELECTRONIC DEVICE AND BATTERY UNIT USING HEAT INSULATING SHEET

(71) Applicant: Panasonic Intellectual Property Management Co., Ltd., Osaka (JP)

(72) Inventors: Kazuma Oikawa, Osaka (JP); Tooru Wada, Osaka (JP); Shigeki Sakaguchi, Kyoto (JP); Takashi Kubo, Osaka (JP); Takashi Tsuruta, Osaka (JP); Shigeaki Sakatani, Osaka (JP); Daido Komyoji, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 929 days.

(21) Appl. No.: 16/877,046

(22) Filed: May 18, 2020

(65) Prior Publication Data

US 2020/0378058 A1 Dec. 3, 2020

(30) Foreign Application Priority Data

May 29, 2019 (JP) .................................. 2019-099912

(51) Int. Cl.
*H01M 10/658* (2014.01)
*D06M 11/79* (2006.01)
(Continued)

(52) U.S. Cl.
CPC ........ *D06M 11/79* (2013.01); *H01M 10/0525* (2013.01); *H01M 10/658* (2015.04); *C01B 33/1585* (2013.01); *D06M 2400/02* (2013.01)

(58) Field of Classification Search
CPC .................................................. H01M 10/658
See application file for complete search history.

(56) References Cited

U.S. PATENT DOCUMENTS

| | | |
|---|---|---|
| 6,699,808 B1 | 3/2004 | Schwertfeger et al. |
| 9,931,819 B2 | 4/2018 | Poupa Parsigneau et al. |

(Continued)

FOREIGN PATENT DOCUMENTS

| | | | |
|---|---|---|---|
| CN | 106241820 A | * | 12/2016 |
| CN | 106241829 | * | 12/2016 |

(Continued)

OTHER PUBLICATIONS

English Translation of Chinese Office Action dated May 23, 2022 for the related Chinese Patent Application No. 202010458455.3.

*Primary Examiner* — Osei K Amponsah
(74) *Attorney, Agent, or Firm* — Rimon P.C.

(57) ABSTRACT

A manufacturing method of a heat insulating sheet of the present disclosure includes a composite generating step of impregnating a nonwoven fiber with a basic sol prepared to generate a composite of a hydrogel-nonwoven fiber, the basic sol being prepared by adding carbonate ester to a water glass composition; and a drying step of drying a liquid contained in the composite at a temperature lower than a critical temperature of the liquid and a pressure lower than a critical pressure of the liquid to remove the liquid from the composite. A heat insulating sheet according to the present disclosure includes an aerogel and a nonwoven fiber, and has a compression rate at 0.30 MPa to 5.0 MPa of 40% or less. In an electronic device of the present disclosure, the heat insulating sheet is disposed between an electronic component and a housing. In a battery unit of the present disclosure, the heat insulating sheet is disposed between batteries. This provides a heat insulating sheet that can be used under a high load and a manufacturing method thereof, and an electronic device and a battery unit including the same.

10 Claims, 5 Drawing Sheets

(51) Int. Cl.
*H01M 10/0525* (2010.01)
*C01B 33/158* (2006.01)

(56) References Cited

U.S. PATENT DOCUMENTS

| | | | |
|---|---|---|---|
| 10,937,787 B2* | 3/2021 | Noh | H01L 21/02532 |
| 2004/0209061 A1* | 10/2004 | Farnworth | A43B 7/34 |
| | | | 428/304.4 |
| 2006/0166075 A1* | 7/2006 | Inoue | H01M 4/8605 |
| | | | 429/492 |
| 2007/0222116 A1 | 9/2007 | Gould et al. | |
| 2012/0097907 A1 | 4/2012 | Bauer et al. | |
| 2016/0016378 A1* | 1/2016 | Oikawa | H01L 23/373 |
| | | | 361/679.55 |
| 2017/0266920 A1 | 9/2017 | Oikawa et al. | |
| 2019/0071818 A1 | 3/2019 | Doshiro et al. | |
| 2019/0145571 A1 | 5/2019 | Oikawa et al. | |
| 2019/0161909 A1* | 5/2019 | Oikawa | D06M 11/79 |
| 2019/0256678 A1 | 8/2019 | Bassaganas Turon et al. | |

FOREIGN PATENT DOCUMENTS

| | | | |
|---|---|---|---|
| CN | 109328280 A | | 2/2019 |
| CN | 109437816 A | | 3/2019 |
| EP | 2974858 | * | 1/2016 |
| EP | 3199493 A | * | 3/2018 |
| EP | 3557234 | | 10/2019 |
| JP | 2003-508334 | | 3/2003 |
| JP | 2003-238182 | | 8/2003 |
| JP | 2012-240251 A | | 12/2012 |
| JP | 2013-001596 A | | 1/2013 |
| JP | 2015048543 | * | 3/2016 |
| JP | 2015048543 A | * | 3/2016 |
| JP | 5934400 B | | 6/2016 |
| JP | 6064149 B | | 1/2017 |
| JP | 2017-507811 | | 3/2017 |
| JP | 2018-204708 A | | 12/2018 |
| JP | 2019-099984 A | | 6/2019 |
| JP | 2019-516844 | | 6/2019 |
| WO | 2012/050035 | | 4/2012 |
| WO | 2017/159438 A1 | | 9/2017 |
| WO | 2018/110546 | | 6/2018 |
| WO | WO2018110055 | * | 6/2018 |
| WO | 2019/087846 | | 5/2019 |

* cited by examiner

Step 1

Step 2

HEAT INSULATING SHEET AND METHOD OF MANUFACTURING THEREOF, AND ELECTRONIC DEVICE AND BATTERY UNIT USING HEAT INSULATING SHEET

BACKGROUND

1. Technical Field

The present disclosure relates to a heat insulating sheet having high strength and a method of manufacturing thereof, and an electronic device and a battery unit using the heat insulating sheet.

2. Description of the Related Art

In fields of automobile and industrial equipment, it is necessary to control heat flow from a heating component in a narrow space or secure product safety and prevention of fire spread. Therefore, a high performance heat insulating sheet excellent in compression properties is required. The heat insulating sheet is expected to be applied to a separator between cells of a lithium ion battery module, for example.

For a lithium ion battery, a fire resistance test, which is a safety standard, is generally performed. The fire resistance test is a method of testing whether one cell in a battery module undergoes thermal runaway to cause ignition or rapture due to a heat chain to the other cells including adjacent cells.

In order to prevent the thermal runaway to adjacent cells, there is a concept of a safe design in which a material having excellent heat insulating properties is interposed between cells. Theoretically, even if the material has a large thickness with a high thermal conductivity, it is possible to prevent the heat chain or spreading fire to the other cell to some extent. However, the battery module is installed in a device where a space to be laid is limited, and thus a dimension thereof is limited.

That is, the battery module is required to have both high capacity and fire resistance or miniaturization.

In order to achieve both of these requirements, it is desired that a heat insulating sheet, which is a separator disposed between cells, has a material having a small thickness and high heat insulating properties. Furthermore, it is assumed that an active material is deteriorated and expanded and the cell is thus swollen during charge and discharge cycling of a battery. Therefore, it is also desired that the heat insulating sheet has a property that is hard to be collapsed. A load applied to the heat insulating sheet between the cells at the time of initially assembling the battery module is relatively small, generally 1 MPa or less.

However, when the battery expands, a load of up to about 5 MPa may be applied to the heat insulating sheet. Therefore, a design of the material of the heat insulating sheet in consideration of compression properties is also important.

Generally, a silica aerogel is known as a material having a small thermal conductivity. The silica aerogel has a network structure in which silica particles in the order of several tens of nm are connected in point contact. For this reason, an average pore diameter of the silica aerogel is 68 nm or less in a mean free path of air.

That is, the thermal conductivity of silica aerogel is lower than a thermal conductivity of stationary air. Therefore, in recent years, a silica aerogel has attracted attention as an excellent heat insulating material. However, a silica aerogel has extremely low strength in various deformation modes such as compression, bending, and shear. In this respect, practicality of the silica aerogel has been conventionally limited.

The inventors of the present application have disclosed a thin and uniform sheet-like heat insulating material in which a silica aerogel and nonwoven fibers are combined to improve handleability, for example, in Japanese Patent No. 6064149. The thin heat insulating sheet devised is excellent in handleability and relatively strong in bending.

The inventors of the present application have also disclosed a heat insulating sheet including a self-supporting rigid composite obtained by molding and drying, in a container, a slurry containing hydrophobic aerogel particles, an inorganic binder such as cement, gypsum, and lime, a surfactant, and a fiber, as a high strength heat insulating material obtained by using an aerogel, for example, in Japanese Patent No. 5934400.

However, when a conventional heat insulating sheet is used by interposing the heat insulating sheet between cells of a battery or the like, the aerogel may be compressed and collapsed under a high load. Therefore, a heat insulating effect under a high load is significantly reduced as compared with a case under a low load.

SUMMARY

The present disclosure provides a heat insulating sheet that can be used even under a high load and a method of manufacturing thereof, and an electronic device and a battery unit using the heat insulating sheet.

A method of manufacturing a heat insulating sheet of the present disclosure includes a composite generating step of impregnating a nonwoven fiber with a basic sol prepared to generate a composite of a hydrogel-nonwoven fiber, the basic sol being prepared by adding carbonate ester to a water glass composition; and a drying step of drying a liquid contained in the composite at a temperature lower than a critical temperature of the liquid and a pressure lower than a critical pressure of the liquid to remove the liquid from the composite.

Further, a heat insulating sheet according to the present disclosure includes an aerogel and a nonwoven fiber, and has a compression rate at 0.30 MPa to 5.0 MPa is 40% or less.

Further, in the electronic device of the present disclosure, the heat insulating sheet is arranged between an electronic component accompanied with heat generation and a housing.

Further, in a battery unit of the present disclosure, the heat insulating sheet is disposed between batteries.

According to these disclosures, it is possible to provide a heat insulating sheet that can be used even under a high load and a method of manufacturing thereof, and an electronic device and a battery unit using the same.

DETAILED DESCRIPTION

Figure 1:
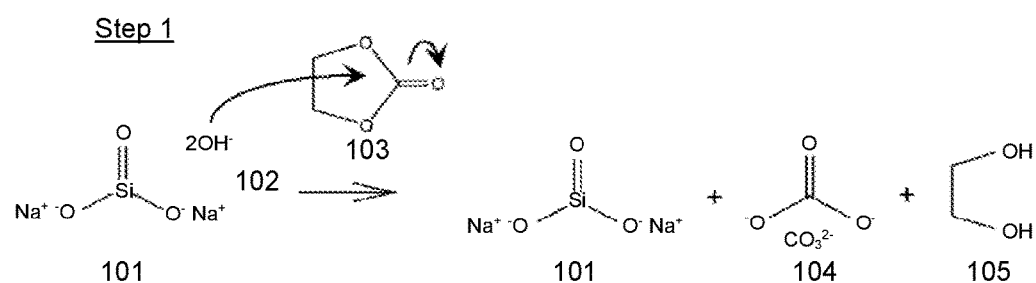
FIG. 1 is chemical formulae illustrating a gelation mechanism of water glass using carbonate ester according to an exemplary embodiment.
Figure 1:
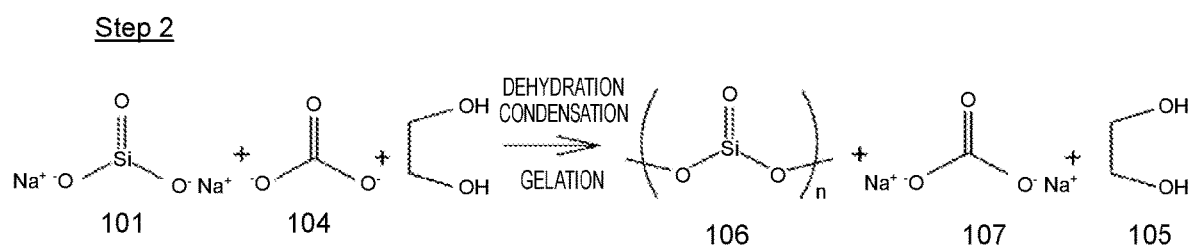

Hereinafter, the present disclosure will be described using a preferred exemplary embodiment as an example.

EXEMPLARY EMBODIMENT

Hereinafter, a heat insulating sheet and a method of manufacturing thereof according to the present exemplary embodiment, and an electronic device and a battery unit using the heat insulating sheet will be described, separately.

Design Concept of Heat Insulating Sheet

In recent years, several aerogel composite heat insulating sheets including a silica aerogel and nonwoven fibers have been known. Most of the aerogel composite heat insulating sheets have been improved in handleability. However, these aerogel composite heat insulating sheets do not have both characteristics of strength that can withstand compression of 5 MPa and high thermal resistance value of 0.01 $m^2K/W$ or more during the compression.

On the other hand, the heat insulating sheet of the present exemplary embodiment includes at least two components of a high-density aerogel and nonwoven fibers, and thus has high strength against the compression, as described later. This is caused by formation of a "high-density silica aerogel" that is dense and combined without space in a gap between continuous nonwoven fibers.

Generally, a silica aerogel refers to a low-density silica porous body. That is, a bulk density of the silica aerogel is less than about 0.3 $g/cm^3$. For the synthesis of the silica aerogel, a low-concentration silica raw material such as alkoxysilane or water glass and a gelling agent such as a mineral acid, a base, or an organic acid are generally used.

Conventionally, when water glass is used as a silica raw material, there is a restriction that a silica concentration at the time of aerogel synthesis is 6% by weight or less. This is because, when a mineral acid, a base, an organic acid, or the like is added as a gelling agent to the silica raw material, hydrolysis and dehydration condensation of sodium silicate rapidly proceed. That is, when the silica concentration exceeds 6% by weight, a reaction rate is too high, and heterogeneous nucleation is thus induced. Therefore, the homogenous aerogel cannot be synthesized.

In the existing method of synthesizing a silica aerogel as described above, since the silica concentration cannot be increased, a high-density aerogel cannot be obtained. That is, it is not possible to increase the strength of the aerogel due to an increase in density of the aerogel.

On the other hand, the silica aerogel of the present exemplary embodiment is prepared by a synthesis method described later, the density of the aerogel can be increased. Thus, a high-strength heat insulating sheet including at least a high-density aerogel and nonwoven fibers can be realized.

Furthermore, according to a method of manufacturing of a heat insulating sheet according to the present exemplary embodiment, a heat insulating sheet having the following preferable physical properties can be obtained.

Compression Rate of Heat Insulating Sheet

A compression rate of the heat insulating sheet is preferably 40% or less, and more preferably 30% or less when a pressure is applied at 5 MPa. The compression rate is a value measured by a table-top precision universal tester (for example, Autograph AGS-X (manufactured by Shimadzu Corporation)).

Thermal Resistance Value of Heat Insulating Sheet

A thermal resistance value of the heat insulating sheet is preferably 0.010 $m^2K/W$ or more, and more preferably 0.015 $m^2K/W$ or more when a pressure is applied at 5 MPa. When a pressure is applied at 0.30 MPa to 5 MPa, the thermal resistance value is a value obtained by dividing a thickness of the heat insulating sheet by the following thermal conductivity.

Thermal Conductivity of Heat Insulating Sheet

A thermal conductivity of the heat insulating sheet cannot be specified unconditionally because it depends on a magnitude of the compression rate, in general. Therefore, the thermal conductivity of the heat insulating sheet may be 100 mW/mK or less. The thermal conductivity is a value measured by a heat flow meter.

Bulk Density of Heat Insulating Sheet

A bulk density of the heat insulating sheet is preferably in a range of 0.3 $g/cm^3$ to 0.6 $g/cm^3$.

Pore Characteristics of High-Density Aerogel

A specific surface area of the high-density aerogel constituting the heat insulating sheet is preferably in a range of 300 $m^2/g$ to 600 $m^2/g$. Further, a pore volume of the high-density aerogel is preferably less than 1.5 ml/g. Further, an average pore diameter of the high-density aerogel is preferably in a range of 10 nm to 70 nm. The pore characteristics of the high-density aerogel is a value measured by a high-precision gas/vapor adsorption measurement instrument.

Thickness of Heat Insulating Sheet

A thickness of the heat insulating sheet is preferably in a range of 0.03 mm to 3.0 mm. Further, the thickness of the heat insulating sheet is more preferably in a range of 0.05 mm to 1.5 mm.

When the thickness of the heat insulating sheet is smaller than 0.03 mm, a heat insulating effect in a thickness direction may be reduced. Therefore, unless the heat insulating sheet has a very low thermal conductivity to a level near the vacuum, heat transfer of the heat insulating sheet from one surface to the other surface in the thickness direction cannot be reduced.

Particularly, when the thickness of the heat insulating sheet is 0.05 mm or more, a higher heat insulating effect can be secured in the thickness direction.

On the other hand, when the heat insulating sheet is larger than 1.5 mm, an occupation volume increases, and thus it is difficult to incorporate the heat insulating sheet into automobile and industrial equipment laid in a limited space. Particularly, in the automobile field, when the thickness of the heat insulating sheet is more than 3.0 mm, it becomes more difficult to incorporate the heat insulating sheet into the equipment.

Content (Filling Rate) of High-Density Aerogel in Heat Insulating Sheet

Generally, a ratio of the high-density aerogel to a weight of the heat insulating sheet cannot be specified unconditionally because the optimum range varies depending on a base weight, a bulk density, a thickness, and the like of the nonwoven fiber.

However, the ratio of the high-density aerogel to the weight of the heat insulating sheet is preferably at least 50% by weight or more and 80% by weight or less.

When the ratio of the high-density aerogel to the weight of the heat insulating sheet is less than 50% by weight, the thermal resistance value of the heat insulating sheet becomes small and the strength against compression or the like cannot be maintained. On the other hand, when the ratio of the high-density aerogel to the weight of the heat insulating sheet is higher than 80% by weight, the thermal resistance value of the heat insulating sheet is improved, but flexibility is insufficient due to the increased strength. Therefore, if the heat insulating sheet is used repeatedly, the high-density aerogel may be fallen off from the nonwoven fiber.

Raw Material of Heat Insulating Sheet

Hereinafter, in order to obtain the heat insulating sheet of the present exemplary embodiment, a nonwoven fiber, a raw material type of the high-density aerogel, and the like will be described.

About Nonwoven Fiber

A base weight of the nonwoven fiber used for manufacturing the heat insulating sheet is preferably in a range of 5 $g/m^2$ to 200 $g/m^2$. Thereby, the nonwoven fiber can maintain the minimum necessary rigidity as a support of the high-density aerogel. The base weight is a weight of the nonwoven fiber per unit area.

Bulk Density of Nonwoven Fiber

A bulk density of the nonwoven fiber in the heat insulating sheet is preferably in a range of 100 $kg/m^3$ to 500 $kg/m^3$. Thereby, a content of the high-density aerogel in the heat insulating sheet can be increased, and the thermal conductivity can be further reduced.

In order to form the nonwoven fiber with mechanical strength as a continuous body, the bulk density of the nonwoven fiber is preferably at least 100 $kg/m^3$ or more.

That is, when the bulk density of the nonwoven fiber is more than 500 $kg/m^3$, a spatial volume in the nonwoven fiber is small. As a result, an amount of the high-density aerogel that can fill the nonwoven fiber is relatively reduced, and thus the thermal resistance value of the heat insulating sheet is likely to be small.

Material of Nonwoven Fiber

A material of the nonwoven fiber used for the heat insulating sheet can be used such as (1) glass wool, glass paper, and rock wool based on an inorganic fiber; (2) polyethylene terephthalate (PET), polyphenylene sulfide (PPS), polypropylene (PP), and polytetrafluoroethylene (PTFE) based on a resin; and (3) natural wool and natural cellulose. Among these, the inorganic fiber materials are preferable as a material of the nonwoven fiber, particularly from the viewpoint of heat resistance and flame retardancy.

Hereinafter, in order to obtain the heat insulating sheet of the present exemplary embodiment, the raw material type for high-density aerogel synthesis and a gelling agent will be described.

About Raw Material Type for High-Density Aerogel Synthesis and Gelling Agent

Raw Material. Type of High-Density Aerogel

As a raw material of the high-density aerogel, general-purpose silica raw materials such as alkoxysilane and water glass are used. Specifically, a dispersion or solution obtained by adding water into the silica raw materials and dispersing or dissolving the silica raw materials in water is used as a raw material of the high-density aerogel so that the silica concentration is in a desired range.

In the present exemplary embodiment, among the silica raw materials, water glass containing Na ion is preferably used as a silica raw material from the viewpoint of economy and safety. That is, a water glass composition in which water glass is dispersed or dissolved in water is suitably used as a raw material for high-density aerogel.

Further, in order to synthesize a high-density aerogel, it is preferable that the silica concentration in a dispersion or solution (particularly, a water glass composition) of the silica raw material is high. Specifically, the silica concentration is particularly preferably in a range of 14 to 22% by weight from the viewpoint that a desired thermal conductivity and compression rate can be obtained.

Gelling Agent and Reaction Mechanism Thereof

In the present exemplary embodiment, carbonate ester found by the inventors of the present application is used as a gelling agent for gelation of the raw material type of the high-density aerogel. It is generally known that carbonate ester hardly changes under an acidic environment, but is hydrolyzed to carbonic acid and alcohol under basic conditions. Specifically, in the present exemplary embodiment, carbonic acid generated by hydrolysis under the basic conditions is used as a gelling agent, and is used for gelation of the raw material type of the high-density aerogel.

As described above, the inventors of the present application have intensively studied a search for a gelling agent in which a high-concentration silica composition having a silica concentration of 8% by weight or more (particularly, a water glass composition) is homogeneously gelled, in order to synthesize a new aerogel. As a result, the inventors of the present application have found that a high-concentration water glass raw material is homogeneously gelled with carbonate esters, which are suitable for synthesizing the high-density aerogel.

Hereinafter, a gelation mechanism of water glass using carbonate ester will be described with reference to chemical reaction formulae in FIG. 1 using ethylene carbonate as an example.

FIG. 1 is chemical formulae illustrating a gelation mechanism of water glass using ethylene carbonate 103 according to the exemplary embodiment.

First, as a first step, ethylene carbonate 103, which is a type of carbonate ester, is added to and dissolved in an aqueous solution (water glass composition) of basic sodium silicate 101 having a pH of 10 or more. At this time, hydroxyl ion 102 in the raw material (water glass composition) nucleophilically attack carbonyl carbon of ethylene carbonate 103. Thereby, hydrolysis of ethylene carbonate 103 proceeds. As a result, carbonate ion ($CO_3^{2-}$) 104 and ethylene glycol 105, which is a type of diol, are generated in the system.

Next, in a second step, sodium silicate 101 reacts with carbonate ion 104, and a dehydration condensation reaction of the silicic acid proceeds. At this time, sodium carbonate 107 is by-produced. As the dehydration condensation reaction of silicic acid proceeds, a network structure consisting of siloxane bonds is developed. As a result, fluidity of the water glass composition is eliminated and the water glass composition is gelled to thereby obtain hydrogel 106. In this case, most of the by-produced sodium carbonate 107 remains in hydrogel 106.

As described above, when ethylene carbonate 103 is used as a gelling agent, the reaction proceeds in two steps. That is, the hydrolysis of sodium silicate 101 in the first step and the dehydration condensation reaction in the second step proceed in order. Therefore, it is possible to control reaction rates of the hydrolysis and the dehydration condensation reaction, respectively. Thereby, uniform gelation of water glass using ethylene carbonate 103 can be achieved.

Here, specific examples of carbonate ester include dimethyl carbonate, diethyl carbonate, dipropyl carbonate, ethyl methyl carbonate, ethylene carbonate, and propylene carbonate. A high-concentration silica raw material (water glass composition) can be homogeneously gelled with any carbonate ester. However, carbonate ester has strong hydrophobicity when an alkyl chain thereof becomes longer, and is thus hardly dissolved in water. Therefore, among the carbonate esters, dimethyl carbonate and ethylene carbonate, which are relatively easily dissolved in water, are preferably used from the viewpoints of solubility in water and a reaction rate of hydrolysis.

Further, when an addition amount of carbonate ester is 1.0 part by weight to 10.0 parts by weight with respect to 100 parts by weight of the total amount of the silica raw material (water glass composition), a uniform gel can be prepared.

An example is described in which carbonate ester is dissolved in the water glass composition in the above description, but the present invention is not limited to this. For example, carbonate ester may be mixed with the water glass composition in a state in which it is dissolved or dispersed in water.

In addition, the addition amount of carbonate ester usually varies in a time required for gelation depending on the silica concentration or the gelling agent concentration in the water glass composition. Thus, the addition amount of carbonate ester is determined in consideration of a relationship between productivity (such as an impregnation rate of a basic sol into the nonwoven fiber described later) and cost for the gelling agent. Therefore, in the present exemplary embodiment, a preferable addition amount of carbonate ester is set in a range of 3.0 parts by weight to 6.0 parts by weight with respect to 100 parts by weight of the total amount of the water glass composition. Carbonate ester is not a solvent but a gelling agent.

Method of Manufacturing Heat Insulating Sheet

Hereinafter, an outline of a method of manufacturing a heat insulating sheet according to the present exemplary embodiment will be described with reference to FIG. 2.

Figure 2:
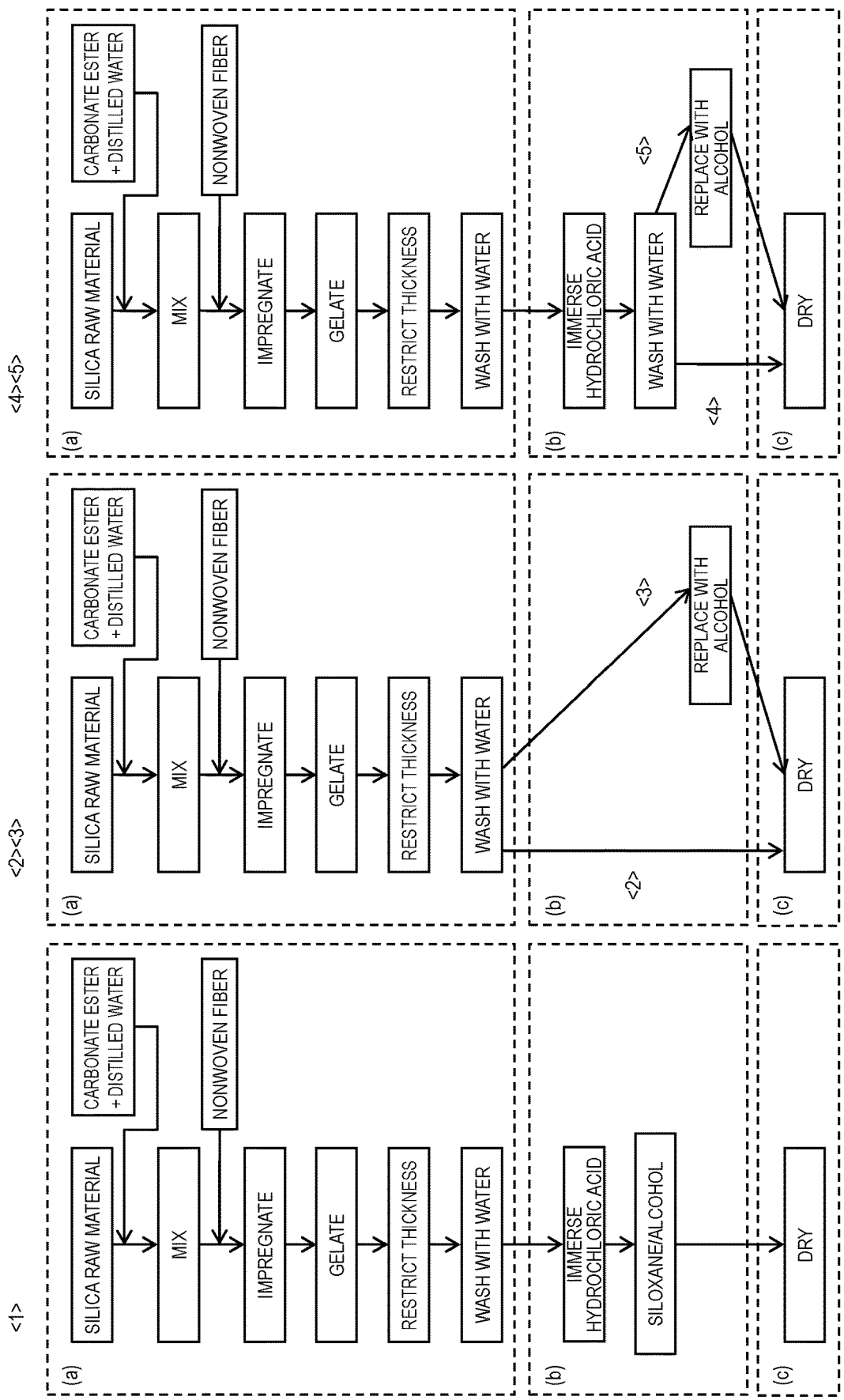
FIG. 2 is a flowchart of a method of manufacturing of a heat insulating sheet according to the exemplary embodiment.

FIG. 2 is a flowchart of a method of manufacturing a heat insulating sheet according to the exemplary embodiment.

As illustrated in FIG. 2, the method of manufacturing a heat insulating sheet includes, for example, five different Patterns <1> to <5> as a basic synthesis method. Each pattern consists of a procedure of three steps from Step (a) to Step (c). However, Step (b) of each pattern is not always necessary. Thus, Step (b) is not performed in Pattern <2>.

Step (a) Composite Generating Step:

As illustrated in FIG. 2, Step (a) is a composite generating step, which is common to Patterns <1> to <5> of the method of manufacturing of a heat insulating sheet.

Specifically, in Step (a) of the composite generating step, first, carbonate ester and distilled water are mixed with each other in a water glass composition as a silica raw material, to prepare a basic sol.

Next, the prepared basic sol is impregnated into a nonwoven fiber and gelled.

Next, the nonwoven fiber impregnated with the basic sol is interposed between films to generate a composite of a hydrogel-nonwoven fiber while restricting the thickness of the films using, for example, a biaxial roll.

Then, if necessary, the composite of a hydrogel-nonwoven fiber is washed with water.

Step (b) Replacing Step:

Step (b) illustrated in FIG. 2 is a replacing step. In the present exemplary embodiment, the replacing step is divided into five patterns from Pattern <1> to Pattern <5> described above. The replacing step is a step of replacing water in the composite of hydrogel-nonwoven fiber with a liquid.

Hereinafter, the replacing step of each of Patterns <1> to <5> will be described individually.

Pattern <1>

In Pattern <1>, first, the composite of hydrogel-nonwoven fiber generated in the composite generating step of Step (a) is immersed in a hydrochloric acid solution.

Next, after the composite of hydrogel-nonwoven fiber is immersed for a certain period of time, the composite is immersed in a silylating agent, put in a thermostat, and left for a certain period of time. As a result, hydrochloric acid is discharged from the composite and separated into two liquids of siloxane in an upper layer and the hydrochloric acid solution in a lower layer.

Next, after the composite is left for a certain period of time, the composite is removed from the silylating agent, and a drying step of Step (c) is performed. That is, water in the composite is removed by the silylating agent.

Pattern <2>

In Pattern <2>, the composite of hydrogel-nonwoven fiber generated in the composite generating step of Step (a) is directly dried in the drying step of Step (c). That is, Pattern <2> corresponds to a pattern in which the above-described replacing step is not performed.

Pattern <3>

In Pattern <3>, water in the composite of hydrogel-nonwoven fiber generated in the composite generating step of Step (a) is replaced with alcohol using an amphiphilic solvent having a small surface tension, such as alcohol or acetone. Then, the composite of hydrogel-nonwoven fiber replaced with alcohol is directly dried in the drying step (c).

Pattern <4>

In Pattern <4>, the composite of hydrogel-nonwoven fiber generated in the composite generating step of Step (a) is immersed in the hydrochloric acid solution once, and then washed with water. Then, the washed composite of hydrogel-nonwoven fiber is directly dried in the drying step of Step (c).

Pattern <5>

In Pattern <5>, the composite of hydrogel-nonwoven fiber generated in the composite generating step of Step (a) is immersed in the hydrochloric acid solution once, and then washed with water.

Next, water in the composite is replaced with alcohol with alcohol using an amphiphilic solvent having a small surface tension, such as alcohol or acetone. Then, the composite of hydrogel-nonwoven fiber replaced with alcohol is directly dried in the drying step (c).

As described above, the heat insulating sheet can be manufactured based on different manufacturing methods from Pattern <1> to Pattern <5>.

In addition, the heat insulating sheet may be manufactured by any of the manufacturing methods of the five patterns from Pattern <1> to Pattern <5>.

However, the following cases need to be considered in Pattern <1> to Pattern <5>.

That is, a liquid property of the hydrogel is alkaline in Pattern <2> and Pattern <3>. Therefore, self-dissolution and self-elution of the composite of hydrogel-nonwoven fiber occur during the drying in Step (c). As a result, thickening of a secondary particle junction (neck) of the silica occurs, and thus the thermal conductivity of the composite may increase.

On the other hand, a liquid property of the hydrogel is acidic to neutral in Pattern <4> and Pattern <5>. Therefore, the self-dissolution of the composite of hydrogel-nonwoven fiber during the drying in Step (c) is suppressed. That is, an increase in the thermal conductivity of the composite can be suppressed.

Considering the above, from the viewpoint of increasing the thermal conductivity, it is considered that the manufacturing method of a heat insulating sheet of Pattern <4> and Pattern <5> is more preferable than that of Pattern <2> and Pattern <3>.

Step (c) Drying Step:

Step (c) illustrated in FIG. 2 is the drying step described above. In the present exemplary embodiment, specifically, the liquid contained in the composite of hydrogel-nonwoven fiber obtained in the replacing step of Step (b) is dried under conditions in which the liquid has a temperature lower than a critical temperature of the liquid and a pressure lower than a critical pressure of the liquid. As a result, the liquid contained in the composite is removed. The drying under the conditions in which the liquid has a temperature lower than a critical temperature of the liquid and a pressure lower than a critical pressure of the liquid is not an essential condition but is a condition from the viewpoint of cost. If there is no problem in cost, it is more preferable to dry the heat insulating sheet in a supercritical state. Thereby, a higher quality heat insulating sheet can be obtained.

In Step (a), when carbonate ester is added to the water glass composition as a gelling agent, silicic acid is dehydrated and condensed, to thereby generate sodium carbonate. Then, the generated sodium carbonate is taken into a gel, and a hydrogel having a very strong basicity may be obtained.

In Step (b) of Pattern <4> and Pattern <5>, when the strong basic hydrogel is immersed in hydrochloric acid, a neutralization reaction between hydrochloric acid and sodium carbonate occurs, and carbon dioxide gas is suddenly generated. Particularly, when the nonwoven fibers having little entanglement between fibers, such as glass paper, are used, a large amount of air bubbles may be generated in a nonwoven fiber sheet due to the generated carbon dioxide gas.

Therefore, in Step (b), washing with water is performed before immersing the hydrogel in hydrochloric acid to remove sodium carbonate in the hydrogel. Washing with water is an essential step in any pattern.

As described above, the heat insulating sheet of the present exemplary embodiment is manufactured.

Hereinafter, characteristics of the heat insulating sheet of the present exemplary embodiment manufactured by the above method will be described based on examples. However, examples of the present exemplary embodiment are not limited to the examples described below.

All the reactions in manufacturing of the heat insulating sheet of the present exemplary embodiment are carried out under an atmospheric pressure.

First, a method of evaluating the manufactured heat insulating sheet will be described.

Evaluation

In each example described below, the heat insulating sheet was manufactured by using ethylene carbonate as a gelling agent and changing the silica concentration in the water glass composition. Then, the bulk density, the thermal conductivity, the compression rate, and the thermal resistance value of the obtained heat insulating sheet were evaluated by the following methods.

The bulk density was obtained from a volume and a weight of the manufactured heat insulating sheet.

The thermal conductivity of the heat insulating sheet was measured by using a heat flow meter HFM436Lamda (manufactured by NETZCH Co., Ltd.).

The compression rate of the heat insulating sheet was measured by using a table-top precision universal tester (for example, Autograph AGS-X (manufactured by Shimadzu Corporation)).

The thermal resistance value of the heat insulating sheet was calculated by dividing the thickness of the heat insulating sheet obtained from the compression rate at a pressure of 5 MPa by the measured thermal conductivity.

The detailed conditions of each example and comparative example will be described below.

Table 1 shows the obtained results. In the abbreviations and symbols shown in Table 1, WG means water glass, ECaq. means an aqueous ethylene carbonate solution, GP means glass paper, and an arrow (←) means "same to the left".

TABLE 1

| | | Example 1 | Example 2 | Example 3 | Example 4 | Example 5 | Example 6 |
|---|---|---|---|---|---|---|---|
| Raw material type/SiO$_2$ concentration [wt %] | | WG 14 | ← 20 | ← ← | ← ← | ← ← | ← ← |
| Gelling agent/ addition amount [parts by weight] | | ECaq. 6 | ← 3 | ← 6 | ← ← | ← ← | ← ← |
| Nonwoven fiber type/thickness [mm] | | GP 0.63 | ← ← | ← 1.08 | ← ← | ← ← | ← ← |
| (b) Pattern of replacing step | | 1 | 1 | 1 | 2 | 3 | 4 |
| Heat insulating sheet | Thickness [mm] | 1.12 | 1.05 | 1.04 | 0.81 | 0.92 | 1.01 |
| | Weight [g] | 4.94 | 6.73 | 6.79 | 6.42 | 6.41 | 6.30 |
| | (1) Bulk density [g/cm$^3$] | 0.31 ○ | 0.44 ○ | 0.44 ○ | 0.55 ○ | 0.48 ○ | 0.43 ○ |

TABLE 1-continued

|  |  |  |  |  |  |  |
|---|---|---|---|---|---|---|
| (2) Thermal conductivity [mW/mK] | 35.5 ◯ | 55.8 ◯ | 46.7 ◯ | 60.8 ◯ | 54.6 ◯ | 53.7 ◯ |
| (3) Compression rate @5 MPa [%] | 35.8 ◯ | 21.3 ◯ | 5.4 ◯ | 7.2 ◯ | 6.1 ◯ | 8.6 ◯ |
| (4) Thermal resistance value @5 MPa [m²K/W] | 0.020 ◯ | 0.015 ◯ | 0.022 ◯ | 0.012 ◯ | 0.016 ◯ | 0.017 ◯ |
| (5) Comprehensive evaluation | ◯ | ◯ | ◯ | ◯ | ◯ | ◯ |

|  | Example 7 | Comparative Example1 | Comparative Example2 | Comparative Example3 | Comparative Example4 |
|---|---|---|---|---|---|
| Raw material type/SiO₂ concentration [wt %] | ← | ← 6 | ← 8 | ← 10 | ← 12 |
| Gelling agent/ addition amount [parts by weight] | ← | ← | ← | ← | ← |
| Nonwoven fiber type/thickness [mm] | ← | ← 0.63 | ← | ← | ← |
| (b) Pattern of replacing step | 5 | 1 | 1 | 1 | 1 |
| Heat insulating sheet Thickness [mm] | 0.97 | 0.90 | 0.95 | 0.99 | 0.99 |
| Heat insulating sheet Weight [g] | 6.13 | 2.57 | 2.87 | 3.21 | 3.52 |
| (1) Bulk density [g/cm³] | 0.44 ◯ | 0.20 X | 0.21 X | 0.22 X | 0.25 X |
| (2) Thermal conductivity [mW/mK] | 52.1 ◯ | 19.4 ◯ | 20.7 ◯ | 24.6 ◯ | 29.9 ◯ |
| (3) Compression rate @5 MPa [%] | 7.9 ◯ | 72.5 X | 67.3 X | 63.8 X | 52.4 X |
| (4) Thermal resistance value @5 MPa [m²K/W] | 0.017 ◯ | 0.013 ◯ | 0.015 ◯ | 0.015 ◯ | 0.016 ◯ |
| (5) Comprehensive evaluation | ◯ | X | X | X | X |

Hereinafter, criteria for pass (O) and fail (X) of each evaluation item shown in Table 1 will be described.

(1) Bulk Density Evaluation

A case where the bulk density of the heat insulating sheet is 0.3 g/cm³ or more and 0.6 g/cm³ or less, it was regarded as pass.

When the bulk density of the heat insulating sheet is less than 0.3 g/cm³, the heat insulating sheet is easily collapsed as a load is applied. On the other hand, when the bulk density of the heat insulating sheet is larger than 0.6 g/cm³, the heat insulating sheet is less likely to be collapsed against the load.

On the other hand, the thermal conductivity of the heat insulating sheet increases. That is, the thermal resistance value of the heat insulating sheet decreases. Therefore, a heat chain easily occurs through the heat insulating sheet during the compression.

(2) Thermal Conductivity Evaluation

A case where the thermal conductivity of the heat insulating sheet is 100 mW/mK or less, it was regarded as pass.

When the thermal conductivity of the heat insulating sheet is more than 100 mW/mK, the thermal resistance value becomes small. Therefore, a heat chain easily occurs through the heat insulating sheet during the compression.

(3) Compression Rate Evaluation

A case where the compression rate of the heat insulating sheet is 40% or less by evaluating under a condition of pressure load of 5.0 MPa, it was regarded as pass. In order to effectively suppress the heat chain at a high load, it is necessary for the heat insulating sheet to withstand compression to some extent and to suppress an increase in a heat transfer component of a solid (for example, silica ($SiO_2$) which is a component of gel).

When the compression rate of the heat insulating sheet is more than 40%, design feasibility of the battery pack is impaired.

(4) Thermal Resistance Value Evaluation

A case where the thermal resistance value of the heat insulating sheet during compression at 5.0 MPa was 0.01 m²K/W or more, it was regarded as pass.

Generally, when evaluating the thermal resistance value, the thermal conductivity is actually measured by applying a load to the heat insulating sheet. However, when the load is particularly high, the heat insulating sheet is collapsed by the compression, and thus it is difficult to measure the thermal conductivity during the compression. Therefore, the thermal resistance value was calculated from actual measurement values of the thickness of the heat insulating sheet obtained from the compression rate and the thermal conductivity measured by a heat flow meter HFM, and was compared and evaluated.

When the thermal resistance value is less than 0.01 m²K/W, a heat chain easily occurs via the heat insulating sheet during the compression.

(5) Comprehensive Evaluation

As a comprehensive evaluation, a case where all of the items (1) to (4) are satisfied was regarded as pass.

Hereinafter, the methods of manufacturing the heat insulating sheets of <Example 1> to <Example 7> and <Comparative Example 1> to <Comparative Example 4> and evaluation results will be described individually.

<Example 1>: Pattern <1>

The heat insulating sheet of Example 1 was manufactured based on the manufacturing method of Pattern <1> illustrated in FIG. 2.

First, 100 parts by weight (20.5 g, a silica concentration of 14% by weight) of a water glass composition prepared by diluting a water glass raw material (corresponding to a silica raw material) with distilled water was prepared. 6 parts by weight (amount of ethylene carbonate: 1.23 g) of an aqueous ethylene carbonate (white crystal) solution, which is a type of carbonate ester, was added to the prepared water glass composition, the mixture was well stirred, dissolved, and mixed, to thereby prepare a basic sol (hereinafter referred to as sol solution).

Next, the prepared sol solution was poured into a nonwoven fiber (material: glass paper, thickness: 0.63 mm, base weight: 100 g/m$^2$, and size: 12 cm square) to homogeneously impregnate the sol solution into the nonwoven fiber. Then, the nonwoven fiber impregnated with the sol solution was interposed between two films (thickness: 50 μm) made of polypropylene (PP), and left at room temperature of 23° C. for 3 minutes, to thereby gel the sol solution.

Next, after confirming gelation, the nonwovenfiber impregnated with the sol solution passed through the biaxial roll together with the films, the biaxial roll having a gap between the films including the film thickness set to be 1.00 mm. Thereby, excess gel was squeezed out of the nonwoven fiber to manufacture a gel sheet including a film whose thickness was restricted to 1.00 mm. The above corresponds to Step (a).

Next, the film was peeled off, and the gel sheet was immersed in 6 N hydrochloric acid, and then left at normal temperature of 23° C. for 10 minutes to incorporate hydrochloric acid into the gel sheet.

Then, the gel sheet incorporating hydrochloric acid was immersed in a mixed solution of octamethyltrisiloxane as a silylating agent and 2-propanol (IPA), put in a thermostat at 55° C., and reacted for 2 hours. When a trimethylsiloxane bond started to form due to the reaction, hydrochloric acid solution was discharged from the gel sheet, resulting in a two-liquid separation state (siloxane in an upper layer, hydrochloric acid solution and 2-propanol in a lower layer). The above corresponds to Step (b).

Next, the gel sheet was transferred to the thermostat set at 150° C. and dried for 2 hours under atmospheric air. Thereby, the heat insulating sheet of Example 1 was manufactured.

Then, various characteristics of the manufactured heat insulating sheet were measured and evaluated by the above-described evaluation method.

As a result, as shown in Table 1, the heat insulating sheet of Example 1 had characteristics of the bulk density of 0.31 g/cm$^3$, the thermal conductivity of 35.5 mW/mK, the compression rate of 35.8%, and the thermal resistance value of 0.02 m$^2$K/W, and the comprehensive evaluation thereof was regarded as pass.

<Example 2>: Pattern <1>

The heat insulating sheet of Example 2 was manufactured based on the manufacturing method of Pattern <1> illustrated in FIG. 2.

The heat insulating sheet of Example 2 was manufactured under the same process conditions as in Example 1, except that the silica concentration in the water glass composition was changed to 20% by weight and the addition amount of the aqueous ethylene carbonate solution was changed to 3 parts by weight.

As a result of evaluating the manufactured heat insulating sheet, as shown in Table 1, the heat insulating sheet had characteristics of the bulk density of 0.44 g/cm$^3$, the thermal conductivity of 55.8 mW/mK, the compression rate of 21.3%, and the thermal resistance value of 0.015 m$^2$K/W, and the comprehensive evaluation thereof was regarded as pass.

<Example 3>: Pattern <1>

The heat insulating sheet of Example 3 was manufactured based on the manufacturing method of Pattern <1> illustrated in FIG. 2.

The heat insulating sheet of Example 3 was manufactured under the same process conditions as Example 2, except that the addition amount of the aqueous ethylene carbonate solution was changed to 6 parts by weight, the thickness of the glass paper was changed to 1.08 mm, the base weight was changed to 170 g/m$^2$, and the size was changed to 12 cm square.

As a result of evaluating the manufactured heat insulating sheet, as shown in Table 1, the heat insulating sheet had characteristics of the bulk density of 0.44 g/cm$^3$, the thermal conductivity of 46.7 mW/mK, the compression rate of 5.4%, and the thermal resistance value of 0.022 m$^2$K/W, and the comprehensive evaluation thereof was regarded as pass.

<Example 4>: Pattern <2>

The heat insulating sheet of Example 4 was manufactured based on the manufacturing method of Pattern <2> illustrated in FIG. 2.

The heat insulating sheet of Example 4 was manufactured by peeling off the film without performing a hydrophobic process, and then directly drying the sheet. The heat insulating sheet was manufactured under the same process conditions as in Example 3, except for the above-described process.

As a result of evaluating the manufactured heat insulating sheet, as shown in Table 1, the heat insulating sheet had characteristics of the bulk density of 0.55 g/cm$^3$, the thermal conductivity of 60.8 mW/mK, the compression rate of 7.2%, and the thermal resistance value of 0.012 m$^2$K/W, and the comprehensive evaluation thereof was regarded as pass.

Not performing the hydrophobic process means that a surface of the gel sheet is not hydrophobized. Specifically, Example 4 differs from Examples 1 to 3 in that the surface of the gel sheet is not treated with a silylating agent. The same applies to the following.

<Example 5>: Pattern <3>

The heat insulating sheet of Example 5 was manufactured based on the manufacturing method of Pattern <3> illustrated in FIG. 2.

The heat insulating sheet of Example 5 was manufactured by peeling off the film without performing a hydrophobic process, replacing (23° C., 10 minutes, and 200 ml×2) water in the sheet with alcohol using 2-propanol (IPA), and then directly drying the sheet. The heat insulating sheet was manufactured under the same process conditions as in Example 3, except for the above-described process.

As a result of evaluating the manufactured heat insulating sheet, as shown in Table 1, the heat insulating sheet had characteristics of the bulk density of 0.48 g/cm$^3$, the thermal conductivity of 54.6 mW/mK, the compression rate of 6.1%, and the thermal resistance value of 0.016 m$^2$K/W, and the comprehensive evaluation thereof was regarded as pass.

<Example 6>: Pattern <4>

The heat insulating sheet of Example 6 was manufactured based on the manufacturing method of Pattern <4> illustrated in FIG. 2.

The heat insulating sheet of Example 6 was manufactured by immersing the gel sheet in 6 N hydrochloric acid without performing a hydrophobic process, replacing (23° C., 10 minutes, and 200 ml×2) hydrochloric acid in the gel sheet with distilled water, and then directly drying the gel sheet. The heat insulating sheet was manufactured under the same process conditions as in Example 3, except for the above-described process.

As a result of evaluating the manufactured heat insulating sheet, as shown in Table 1, the heat insulating sheet had characteristics of the bulk density of 0.43 g/cm$^3$, the thermal conductivity of 53.7 mW/mK, the compression rate of 8.6%, and the thermal resistance value of 0.017 m$^2$K/W, and the comprehensive evaluation thereof was regarded as pass.

<Example 7>: Pattern <5>

The heat insulating sheet of Example 7 was manufactured based on the manufacturing method of Pattern <5> illustrated in FIG. 2.

The heat insulating sheet of Example 7 was manufactured by immersing the gel sheet in 6 N hydrochloric acid without performing a hydrophobic process, replacing (23° C., 10 minutes, and 200 ml×2) hydrochloric acid in the gel sheet with distilled water, and further replacing (23° C., 10 minutes, and 200 ml×1) water in the gel sheet with alcohol using 2-propanol (IPA), and then directly drying the gel sheet. The heat insulating sheet was manufactured under the same process conditions as in Example 3, except for the above-described process.

As a result of evaluating the manufactured heat insulating sheet, as shown in Table 1, the heat insulating sheet had characteristics of the bulk density of 0.44 g/cm$^3$, the thermal conductivity of 52.1 mW/mK, the compression rate of 7.9%, and the thermal resistance value of 0.017 m$^2$K/W, and the comprehensive evaluation thereof was regarded as pass.

Comparative Example 1

The heat insulating sheet of Comparative Example 1 was manufactured under the same process conditions as in Example 1, except that the silica concentration in the water glass composition was changed to 6% by weight.

As a result of evaluating the manufactured heat insulating sheet, as shown in Table 1, the heat insulating sheet had characteristics of the bulk density of 0.20 g/cm$^3$, the thermal conductivity of 19.4 mW/mK, the compression rate of 72.5%, and the thermal resistance value of 0.013 m$^2$K/W, and the comprehensive evaluation thereof was regarded as fail.

Comparative Example 2

The heat insulating sheet of Comparative Example 2 was manufactured under the same process conditions as in Example 1, except that the silica concentration in the water glass composition was changed to 8% by weight.

As a result of evaluating the manufactured heat insulating sheet, as shown in Table 1, the heat insulating sheet had characteristics of the bulk density of 0.21 g/cm$^3$, the thermal conductivity of 20.7 mW/mK, the compression rate of 67.3%, and the thermal resistance value of 0.015 m$^2$K/W, and the comprehensive evaluation thereof was regarded as fail.

Comparative Example 3

The heat insulating sheet of Comparative Example 3 was manufactured under the same process conditions as in Example 1, except that the silica concentration in the water glass composition was changed to 10% by weight.

As a result of evaluating the manufactured heat insulating sheet, as shown in Table 1, the heat insulating sheet had characteristics of the bulk density of 0.22 g/cm$^3$, the thermal conductivity of 24.6 mW/mK, the compression rate of 63.8%, and the thermal resistance value of 0.015 m$^2$K/W, and the comprehensive evaluation thereof was regarded as fail.

Comparative Example 4

The heat insulating sheet of Comparative Example 4 was manufactured under the same process conditions as in Example 1, except that the silica concentration in the water glass composition was changed to 12% by weight.

As a result of evaluating the manufactured heat insulating sheet, as shown in Table 1, the heat insulating sheet had characteristics of the bulk density of 0.25 g/cm$^3$, the thermal conductivity of 29.9 mW/mK, the compression rate of 52.4%, and the thermal resistance value of 0.016 m$^2$K/W, and the comprehensive evaluation thereof was regarded as fail.

Consideration for Each Evaluation Item.

Hereinafter, the heat insulating sheets of Examples 1 to 7 and Comparative Examples 1 to 4 were considered for each evaluation item with reference to FIGS. 3 to 6.

Compression Rate of Heat Insulating Sheet

Figure 3:
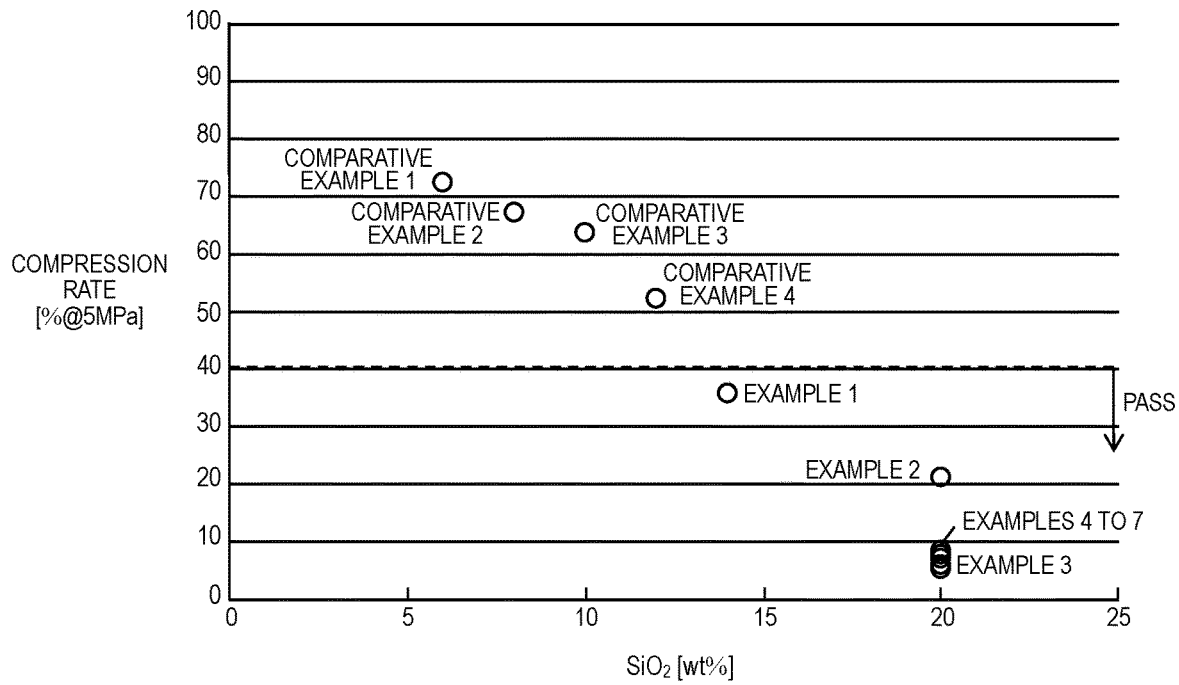
FIG. 3 is a diagram showing a relationship between a $SiO_2$ concentration in a water glass composition and a compression rate of the heat insulating sheet according to the exemplary embodiment.

First, the compression rate of the heat insulating sheet was considered with reference to FIG. 3.

As described above, the compression rate of the heat insulating sheet is preferably 40% or less, and more preferably 30% or less at a pressure load of 5 MPa.

FIG. 3 is a graph showing a relationship between the compression rate of the heat insulating sheet manufactured in respective examples and comparative examples at a pressure load of 5 MPa and the silica concentration in the water glass composition.

As illustrated in FIG. 3, when the compression rate of the heat insulating sheet is more than 40%, the heat insulating sheet is easily collapsed, and thus adjacent cells are approached to each other. Therefore, when one of the cell undergoes thermal runaway, it is difficult to suppress the heat chain due to heat transfer through the heat insulating sheet. On the other hand, when the compression rate of the heat insulating sheet is 40% or less, the heat chain that transfers heat through the heat insulating sheet can be effectively suppressed because the approach among the adjacent cells is suppressed.

Thermal Resistance Value of Heat Insulating Sheet

Figure 4:
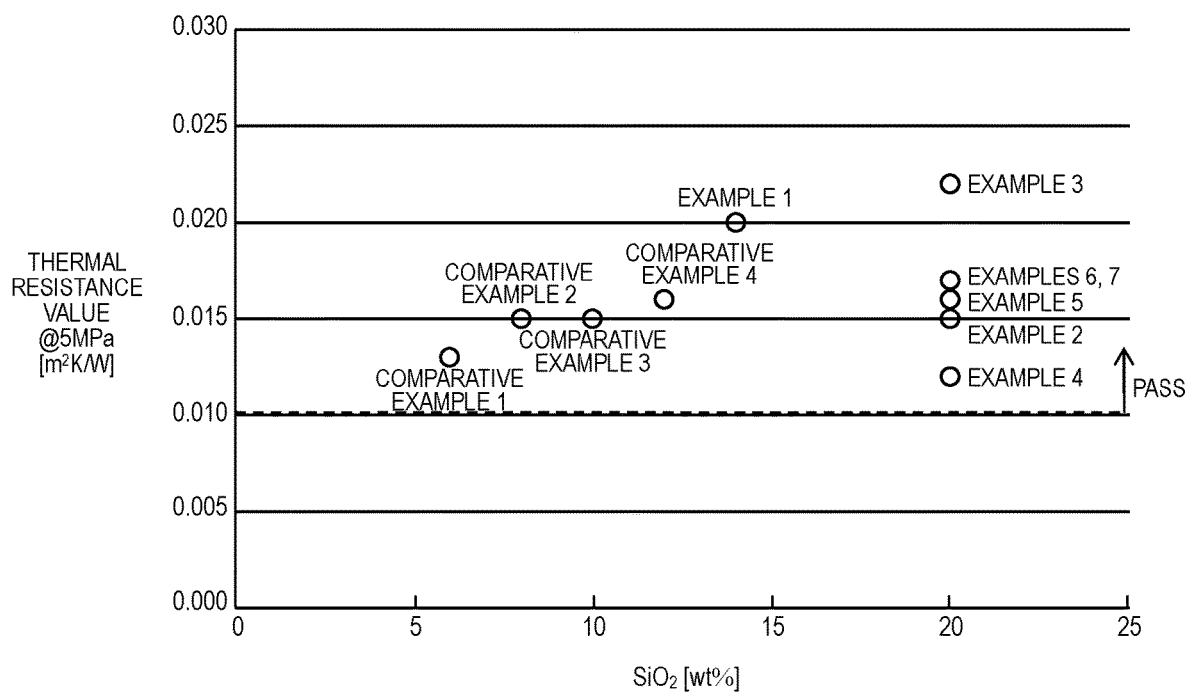
FIG. 4 is a diagram showing a relationship between a $SiO_2$ concentration in a water glass composition and a thermal resistance value of the heat insulating sheet according to the exemplary embodiment.

Next, the thermal resistance value of the heat insulating sheet was considered with reference to FIG. 4.

As described above, the thermal resistance value of the heat insulating sheet is preferably 0.010 $m^2K/W$ or more, and more preferably 0.015 $m^2K/W$ or more when a pressure load is applied at 5 MPa.

FIG. 4 is a graph showing a relationship between the thermal resistance value of the heat insulating sheet manufactured in respective examples and comparative examples at a pressure load of 5 MPa. and the silica concentration in the water glass composition.

As illustrated in FIG. 4, when the thermal resistance value of the heat insulating sheet is less than 0.010 $m^2K/W$, and when one of the adjacent cells undergoes thermal runaway, the generated heat easily transfers heat to the heat insulating sheet, and thus it is difficult to suppress the heat chain during compression of the heat insulating sheet. On the other hand, when the thermal resistance value of the heat insulating sheet is 0.015 $m^2K/W$ or more, heat transfer from the cell that has undergone thermal runaway can be suppressed by the heat insulating sheet. Therefore, during the compression, the heat chain due to the heat transfer from the cell that has undergone thermal runaway can be effectively suppressed by the heat insulating sheet.

Thermal Conductivity of Heat Insulating Sheet

Figure 5:
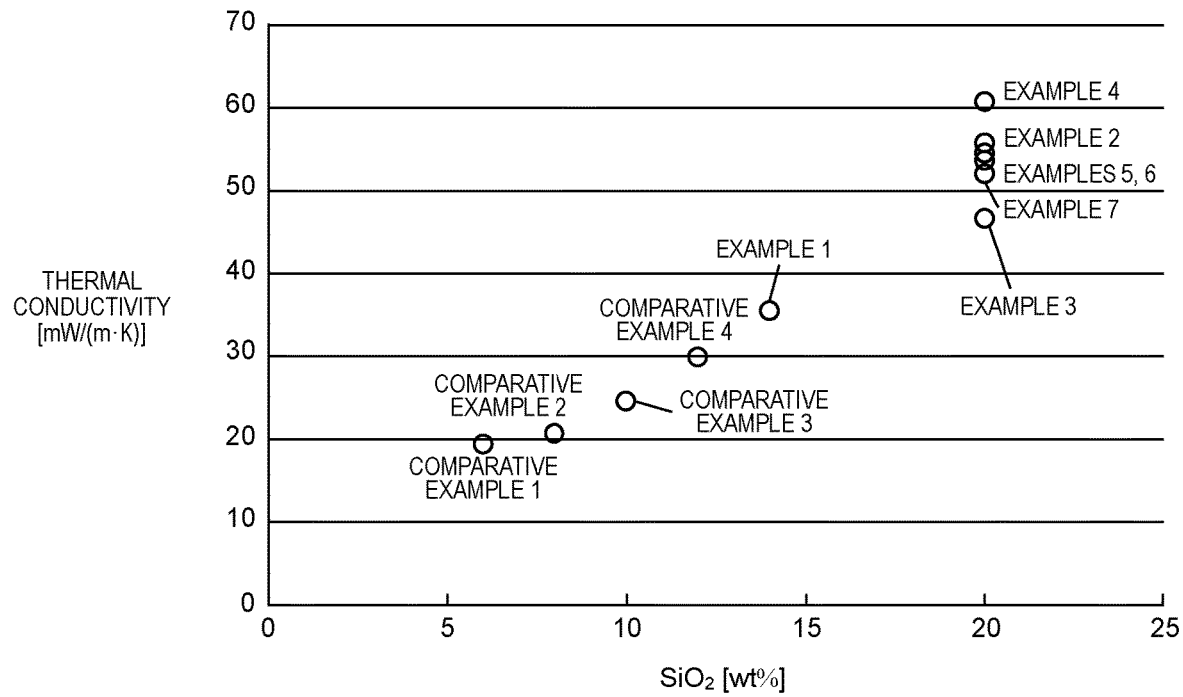
FIG. 5 is a diagram showing a relationship between a $SiO_2$ concentration in a water glass composition and a thermal conductivity of the heat insulating sheet according to the exemplary embodiment.

Next, the thermal conductivity of the heat insulating sheet was considered with reference to FIG. 5.

As described above, the thermal conductivity of the heat insulating sheet cannot be specified unconditionally because it also depends on a magnitude of the compression rate, and may be 100 mW/mK or less.

FIG. 5 is a graph showing a relationship between the thermal conductivity of the heat insulating sheet manufactured in respective examples and comparative examples and the silica concentration in the water glass composition.

As illustrated in FIG. 5, when the thermal conductivity of the heat insulating sheet is more than 100 mK/mW, and when one of the adjacent cells undergoes thermal runaway, the generated heat easily transfers heat to the heat insulating sheet, and thus it is difficult to suppress the heat chain during compression of the heat insulating sheet.

Bulk Density of Heat Insulating Sheet

Figure 6:
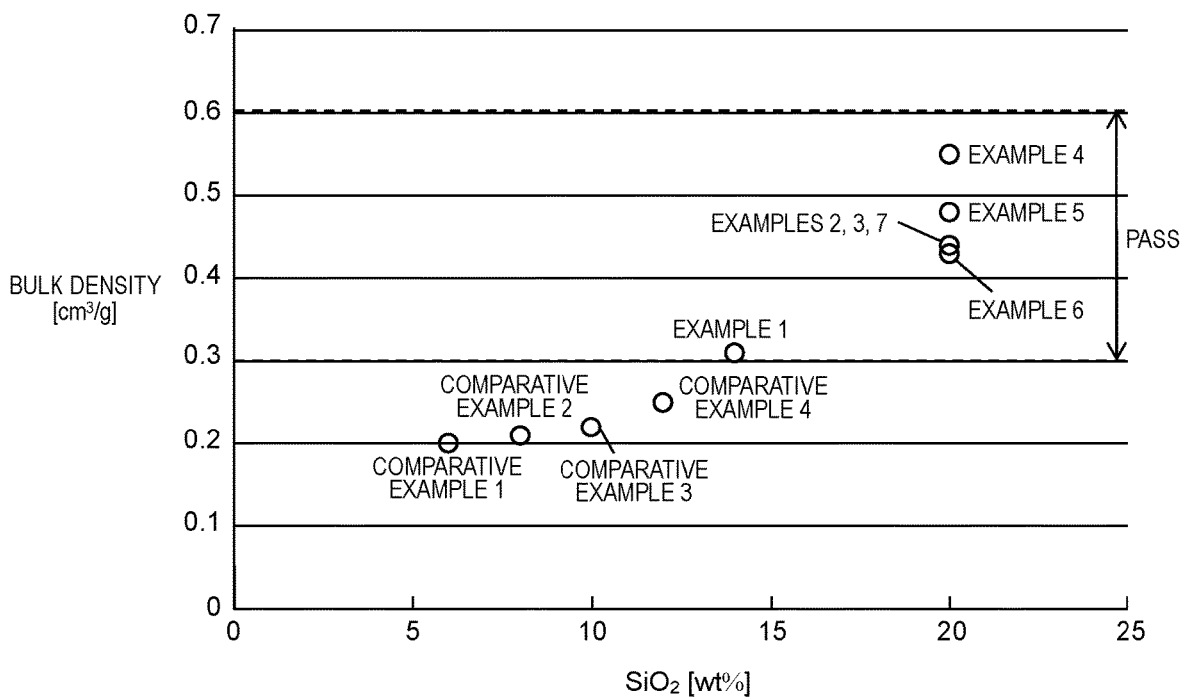
FIG. 6 is a diagram showing a relationship between a $SiO_2$ concentration in a water glass composition and a bulk density of the heat insulating sheet according to the exemplary embodiment.

Next, the bulk density of the heat insulating sheet was considered with reference to FIG. 6.

As described above, the bulk density of the heat insulating sheet is preferably in a range of 0.3 $g/cm^3$ to 0.6 $g/cm^3$.

FIG. 6 is a diagram of the heat insulating sheet manufactured in respective examples and comparative examples, in which a horizontal axis plots the silica concentration in the water glass composition during the manufacturing of the heat insulating sheet, and a vertical axis plots the bulk density of the obtained heat insulating sheet.

As illustrated in FIG. 6, when ethylene carbonate is used as the gelling agent, the bulk density of the heat insulating sheet tends to increase as the silica concentration increases.

When the bulk density is less than 0.3 $g/cm^3$, the heat insulating sheet is easily collapsed as a high load is applied. That is, the heat insulating sheet has a large compression rate and a small thermal resistance value.

On the other hand, when the bulk density is more than 0.6 $g/cm^3$, primary silica particles are remarkably coarsened and the aerogel itself shrinks. That is, even when no load is applied, a heat insulating sheet having an expected thermal resistance value cannot be obtained.

As described above, the bulk density of the heat insulating sheet is preferably in a range of 0.3 $g/cm^3$ or more and 0.6 $g/cm^3$ or less.

Summary of Evaluation Results

As described above, in Examples 1 to 7, the heat insulating sheets were manufactured by using the water glass composition having a silica concentration of 14% by weight to 20% by weight and ethylene carbonate, which is a type of carbonate ester.

As a result, the compression rate of each heat insulating sheet at 5.0 MPa was 40% or less, and the thermal resistance value of each heat insulating sheet was 0.01 $m^2K/W$ or more.

Furthermore, the heat insulating sheets of Examples 4 to 7 had the compression rate of 40% or less and the thermal resistance value of 0.01 $m^2K/W$ or more, without performing a hydrophobic process, and desired characteristics can thus be satisfied.

On the other hand, the heat insulating sheets of Comparative Examples 1 to 4 were manufactured by using the water glass composition having a silica concentration of 6% by weight to 12% by weight and ethylene carbonate.

As a result, the compression rate of each heat insulating sheet at 5.0 MPa was more than 40%.

From the above results, it was found that the heat insulating sheet including the water glass composition having the silica concentration of 14% by weight to 20% by weight, and high-density aerogel-nonwoven fibers synthesized using ethylene carbonate, which is a type of carbonate ester, had a high strength and excellent characteristics. Thereby, it was made clear that the heat insulating sheet can suppress a heat chain effectively under a high load condition.

Others

The heat insulating sheet of the present exemplary embodiment includes an aerogel and nonwoven fibers as main components, and does not include other compounds as main components. Further, a total weight of the aerogel and the nonwoven fibers is 90% by weight or more with respect to the total weight of the heat insulating sheet.

Generally, a silica aerogel refers to a low-density silica porous body as described above, and has a bulk density of less than about 0.3 $g/cm^3$.

In order to prevent irreversible shrinkage during drying, the low-density silica porous body is usually obtained by performing a hydrophobic (water repellent) process in a step after Step (a) illustrated in FIG. 2.

However, in the method of manufacturing a heat insulating sheet according to the present exemplary embodiment, the silica concentration is higher than usual, 14% by weight to 22% by weight. Thereby, a strength that can withstand a capillary force at the time of drying is given to the heat insulating sheet. Therefore, a heat insulating sheet having a desired strength can be obtained without performing a hydrophobic (water repellent) process.

Hereinafter, application examples of the heat insulating sheet of the present exemplary embodiment will be described with reference to FIGS. 7 and 8.

Figure 7:
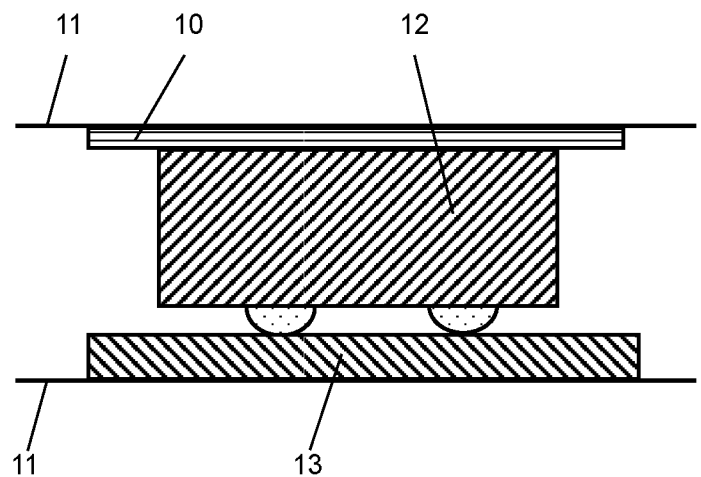
FIG. 7 is a cross-sectional view of an electronic device as an application example of the heat insulating sheet according to the exemplary embodiment.

FIG. 7 is a cross-sectional view of an electronic device as Application Example 1 of the heat insulating sheet according to the embodiment. Specifically, FIG. 7 is a schematic diagram illustrating a configuration of an electronic device including electronic component 12 accompanied by heat generation and housing 11.

As illustrated in FIG. 7, heat insulating sheet 10 of the present exemplary embodiment is disposed between electronic component 12 accompanied by heat generation and is mounted on substrate 13 and housing 11 in the electronic device.

Thus, heat insulating sheet 10 suppresses heat transfer of electronic component 12 that generates heat to housing 11. Therefore, heat transfer to housing 11 is substantially reduced.

Further, heat insulating sheet 10 may be covered with a cover that covers a surface. Thereby, powder falling can be prevented. Heat insulating sheet 10 may have a configuration in which a heat conductive material such as a graphite sheet is laminated.

Figure 8:
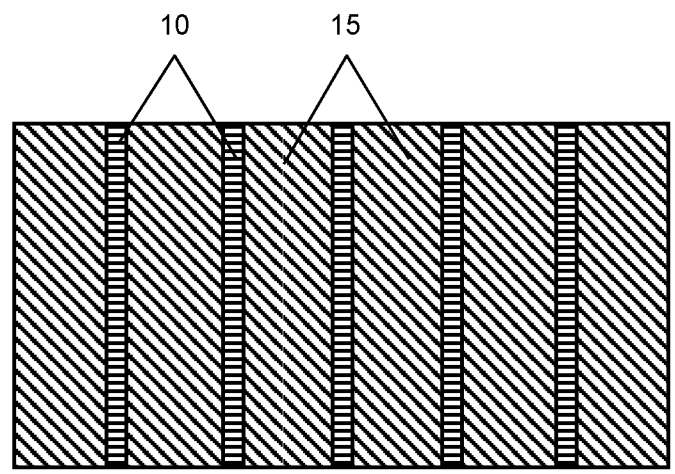
FIG. 8 is a cross-sectional view of a battery unit as an application example of the heat insulating sheet according to the exemplary embodiment.

FIG. 8 is a cross-sectional view of a battery unit as Application Example 2 of the heat insulating sheet according to the exemplary embodiment. Specifically, FIG. 8 is a cross-sectional view of a battery unit having a plurality of batteries mounted on vehicle or the like.

As illustrated in FIG. 8, heat insulating sheet 10 of the present exemplary embodiment is disposed between adjacent batteries 15 in the battery unit. Thereby, not only the heat insulation between the adjacent batteries 15 but also the prevention of the spread of fire can be achieved.

Battery 15 in the battery unit is not limited to a battery for a vehicle. Battery 15 may be, for example, a battery of various moving objects or a battery of a home power storage device. Further, heat insulating sheet 10 may be disposed in a state of being combined with another sheet or the like.

What is claimed is:

1. An electronic device comprising:
a heat insulating sheet;
an electronic component accompanied by heat generation; and
a housing, wherein:
the heat insulating sheet comprises:
an aerogel; and
a nonwoven fiber,
a compression rate at 5.0 MPa of the heat insulating sheet is 40% or less, and
a thermal resistance value during compression at 5.0 MPa of the heat insulating sheet is 0.01 $m^2K/W$ or more, and
the heat insulating sheet is disposed between the electronic component and the housing.

2. A battery unit comprising:
a heat insulating sheet; and
a plurality of batteries, wherein:
the heat insulating sheet comprises:
an aerogel; and
a nonwoven fiber,
a compression rate at 5.0 MPa of the heat insulating sheet is 40% or less, and
a thermal resistance value during compression at 5.0 MPa of the heat insulating sheet is 0.01 $m^2K/W$ or more, and
the heat insulating sheet is disposed between adjacent batteries of the plurality of batteries.

3. The electronic device according to claim 1, wherein a ratio of a weight of the aerogel to a weight of the heat insulating sheet is 50% or more.

4. The electronic device according to claim 1, wherein a ratio of a weight of the aerogel to a weight of the heat insulating sheet is 50% or more and 80% or less.

5. The battery unit according to claim 2, wherein the aerogel has
a specific surface area of 300 $m^2/g$ or more and 600 $m^2/g$ or less, and
a pore volume of less than 1.5 ml/g.

6. The battery unit according to claim 2, wherein a bulk density of the heat insulating sheet is 0.3 $g/cm^3$ or more and 0.5 $g/cm^3$ or less.

7. The battery unit according to claim 2, wherein a ratio of a weight of the aerogel to a weight of the heat insulating sheet is 50% or more.

8. The battery unit according to claim 2, wherein a ratio of a weight of the aerogel to a weight of the heat insulating sheet is 50% or more and 80% or less.

9. The electronic device according to claim 1, wherein the aerogel has a specific surface area of 300 $m^2/g$ or more and 600 $m^2/g$ or less, and a pore volume of less than 1.5 ml/g.

10. The electronic device according to claim 1, wherein a bulk density of the heat insulating sheet is 0.3 $g/cm^3$ or more and 0.5 $g/cm^3$ or less.

* * * * *